United States Patent [19]

Brown

[11] Patent Number: 4,642,933

[45] Date of Patent: Feb. 17, 1987

[54] FISHING LURE RIGGING SYSTEM

[76] Inventor: Frank E. Brown, c/o Vic Berger's World of Archery, 2819 E. Main St., Springfield, Ohio 45503

[21] Appl. No.: 794,816

[22] Filed: Nov. 4, 1985

[51] Int. Cl.$^4$ ............................................. A01K 85/00
[52] U.S. Cl. ................... 43/42.36; 43/44.97; 43/44.9; 43/42.35
[58] Field of Search ................ 43/42.36, 42.23, 42.05, 43/42.49, 44.97, 44.9, 42.35

[56] References Cited

U.S. PATENT DOCUMENTS

| | | | |
|---|---|---|---|
| 2,565,205 | 8/1951 | Culver | 43/42.36 |
| 2,756,535 | 7/1956 | Dean | 43/42.36 |
| 3,205,608 | 9/1965 | Dickinson | 43/42.23 |
| 3,514,890 | 6/1970 | Francklyn | 43/42.05 |
| 3,541,718 | 11/1970 | Norman | 43/42.35 |
| 4,144,665 | 3/1979 | Dake | 43/42.36 |

Primary Examiner—Nicholas P. Godici
Assistant Examiner—Karen Skillman
Attorney, Agent, or Firm—Biebel, French & Nauman

[57] ABSTRACT

A fishing lure rigging system in which a lure body includes forward and rearward hooks and is separable from the hooks should one or both hooks become snagged beneath the surface of the water or in an object such as a tree when casting the lure. The lure body includes a forward channel which extends from the nose portion to the underside of a mid-portion of the body and a rearward channel which extends from the mid-portion of the body, adjacent to the forward channel, to the tail portion of the body. The lure is rigged by first running the line through the hole in the bill, then through the front line port, through the center hook eye, through the rear line port, then the rear hook is tied on. Should either hook set become caught, the line can be broken and the body separated from the hook sets. In one embodiment, the body includes a bill and the forward channel includes an external segment which extends downwardly from the bill and rearwardly to enter the body at a location spaced from the bill; the external segment acting to eliminate sharp bends in the line to eliminate kinking and to promote lure action, and acting as a bumper to prevent snagging of the hook sets.

10 Claims, 6 Drawing Figures

FISHING LURE RIGGING SYSTEM

BACKGROUND OF THE INVENTION

The present invention relates to fishing lures and, more particularly, to fishing lure rigging systems designed so that the lure body is separable from the lure hook sets should hook sets become snagged.

The typical fishing lure comprises a lure body, which may be of the floating or sinking variety, and at least one hook set attached to the body. Fishing line typically is attached to an eyelet mounted on a forward portion of the body. Such fishing lures become snagged easily on submerged objects such as weeds or logs when reeled in, and can become snagged on trees or bridge girders above the water when cast.

When such lures are snagged, one common remedy for the fisherman is to exert tension on the line in an effort to free the lure from the object to which it is snagged. Unfortunately, a frequent result of such efforts is that the line breaks in front of the lure, leaving the snagged lure attached to the snagged object and irretrievably lost.

Many lures have been designed to minimize the loss occurring from such snags. For example, the Francklyn U.S. Pat. No. 3,514,890 discloses a fishing lure in which the body includes a channel through which the fishing line is threaded, so that the body can slide along the line. Rather than being tied to the lure body, the end of the fishing line extends through the body and is tied directly to one or two hook sets which trail behind and beneath the body. The body includes a split ring for clamping the line so that the hook sets are free to dangle below the body and the reeling force exerted by the line is borne by the split ring.

Should the hook sets become snagged, a tug on the line dislodges the line from the split ring. The lure body, which is buoyant, is free to float upwardly to the surface as the line slides through the channel in the body, and may be recovered for subsequent use with different hook sets.

A disadvantage with such a lure is that, when using multiple hook sets, only one hook set may be positioned adjacent to the lure body, while additional hook sets dangle below and away from the body. Accordingly, only one hook set is sufficiently adjacent to the body to be swallowed by a fish attempting to swallow the lure body.

Another returnable lure is disclosed in the Dickinson U.S. Pat. No. 3,205,608. That lure comprises a body made of a flexible material having a symmetrical, arcuate shape. The extreme forward and rearward portions of the body include holes through which a fishing line is threaded. In one embodiment, the line is threaded through the body, spanning the arcuate portion, and is attached to a rear hook set which tarils the tail of the body. A forward hook set is slideably attached to the line in the span between arcuate portions and is spaced from the rear portion by a plurality of beads threaded on the line behind the hook set. A disadvantage with such a design is that the orientation of the holes is such that the line attached to the lure and hooks must make sharp bends, which tend to weaken the strength of the line at those points, and the "action" of the lure upon reeling is affected.

Accordingly, there is a need for a fishing lure having a retrievable body in which more than one hook set may be positioned sufficiently close to the body to be swallowed by a fish attempting to swallow the lure body. Furthermore, there is a need for a lure having a retrievable body in which the action of the lure upon retrieval is optimized, and in which, sharp bends in the line as it passes through the lure are eliminated.

SUMMARY OF THE INVENTION

The present invention is a fishing lure rigging system which consists of a buoyant lure body having a nose portion, a tail portion, a forward tubular channel extending from the nose portion to the underside of the mid-portion of the body, and a rearward tubular channel extending from the mid-portion to the tail portion. The openings of the forward and rearward channels at the mid-portion of the body are adjacent to each other so that a fishing line threaded through the tubular channels is exposed at that point to pass through the eye of a forward hook set. The end of the fishing line protrudes from the tail of the lure and is attached to a rearward hook set.

If either hook set becomes snagged during casting or reeling in, the buoyant lure body is free to slide along the line away from the hook sets and back to the user. For example, should the lure become snagged under water by either hook set, the line is broken by the user so that the body is free to slide along the line upwardly toward the surface. Should the body become snagged in a tree or other object during a cast, the line is again broken and the lure body slides along the remaining segment downwardly back to the user.

An advantage of the lure rigging system of the present invention not found in prior art lures is that the lure body is designed to accomodate at least two hook sets such that each hook set is positively held next to the lure body at a predetermined location, which may be made optimal for the particular type of lure body used.

In a preferred embodiment, the lure body includes a bill protruding from the nose portion, and the forward channel includes an exterior segment which extends from the bill downwardly and rearwardly to enter the body. This exterior segment intersects the bill at an angle which is selected to minimize the bend or "kink" in the fishing line at the point at which it leaves the forward tubular channel. The absence of a kink eliminates a weakness in the line that otherwise would be present at that location, and, more importantly, has been found to enhance the action of the lure during its retrieval.

Also in the preferred embodiment, the exterior segment is shaped to extend below the underside of the lure body and thus acts as a "bumper" for the lure. When such a lure is reeled in, the exterior segment would contact a submerged object and deflect the lure upwardly to avoid snagging the hook sets on the submerged object, thereby reducing the likelihood of snagging.

In another embodiment, the bill includes a split ring which is positioned forwardly of the opening of the forward channel. The line is attached to the split ring so that the length of line extending through the forward and rearward channels is sufficiently long to allow the rearward hook set to trail behind the lure body.

Accordingly, it is an object of the present invention to provide a fishing lure rigging system in which the lure body is retrievable from snags both above the surface of the water and beneath the surface of the water; a rigging system in which multiple hook sets may be employed so that they are held adjacent to the lure body and at predetermined locations which are optimal for the body; a fishing lure rigging system in which the fishing line is attached to the lure such that sharp bends are eliminated to avoid weak spots in the line and increase the action of the lure; and, a fishing lure rigging system in which a forward line channel doubles as a bumper to reduce the likelihood of snagging.

Other objects and advantages will become apparent from the following description, the accompanying drawings, and the appended claims.

DETAILED DESCRIPTION OF THE PREFERRED EMBODIMENTS

Figure 1:
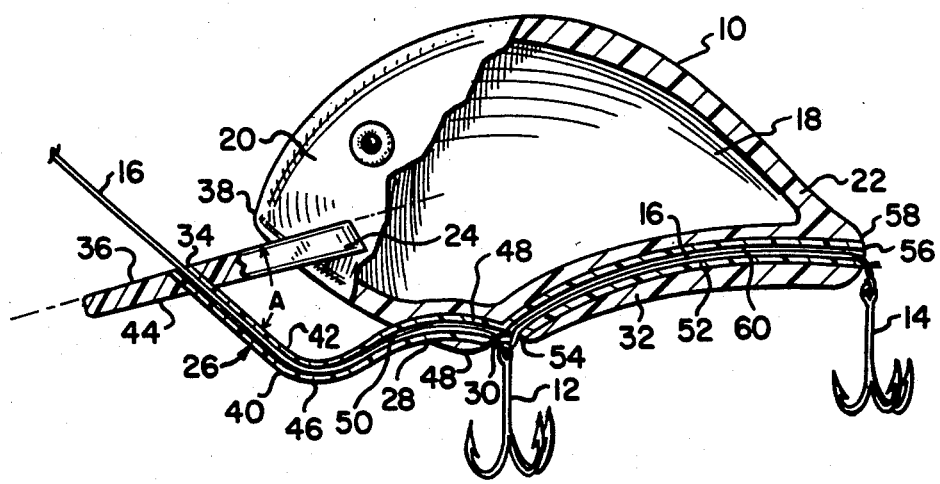
FIG. 1 is a side elevation of a preferred embodiment of the lure rigging system of the present invention in which the lure body and bill are partially broken away.
Figure 2:
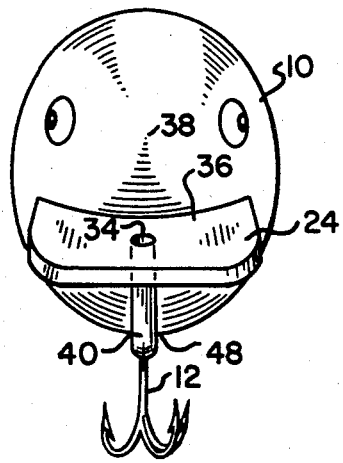
FIG. 2 is a front elevation of the lure of the rigging system of FIG. 1.

The preferred embodiment of the fishing lure rigging system of the present invention is shown in FIGS. 1 and 2 and includes a body 10, a forward hook set 12, a rearward hook set 14, and a line 16 joining the forward and rearward hook sets to the body. The body 10 is made of plastic and includes an internal cavity 18 which adds to the overall buoyancy of the lure. However, it is within the scope of the invention to provide a lure body which is made of a material sufficiently buoyant to eliminate the need for an internal cavity.

The body 10 includes a nose portion 20 and a tail portion 22. A bill 24, made of a clear, tough plastic such as an acrylic is attached to the nose 20 and extends fowardly and slightly downwardly therefrom.

A forward, tubular channel 26 extends from the bill 24 downwardly and rearwardly to enter the body at point 28. The channel 26 continues through the body to terminate at an opening 30 located at a mid-portion of the underside 32 of the body. The entry opening 34 of the channel 26 is flush with the upper surface 36 of the bill 24 and is spaced outwardly from the tip 38 of the nose 20.

The channel 26 includes an external segment 40 having a shank 42 which extends from the underside 44 of the bill to the entry point 28. The shank 42 includes an arcuate portion 46 which extends below the lowermost point 48 of the underside 32 of the body 10. The external segment 40 can function as a "bumper" to prevent the fouling or snapping of the hook set 12 as the lure is retrieved.

The angle at which the shank 42 makes with the surface 36 of the bill 24 is set to minimize the bending of the line 16 at the entry opening 34 as the lure is reeled in. With the specific body shape and bill shape shown, the shank 42 makes an angle A of approximately 57° with the surface 36. It should also be noted that the arcuate portion 46 is curved with a relatively large radius of curvature to eliminate the occurrence of any sharp bends or kinking of the line 16 in that region.

Extending between the entry point 28 and the opening 30 through the body 10 is an internal segment 48. In the embodiment shown, the entire channel 26 comprises a single length of plastic tubing which is molded into the body 10 between points 28 and 30, and is attached to the bill 24 by an adhesive at the time the bill is attached to the body. The interior 50 of the channel 26 is sized to allow the line 16 to move freely, both in a longitudinal and in a lateral sense. This dimensioning also reduces the likelihood of the line kinking and twisting, which could possibly prevent the body 10 from being retrieved should the hook sets 12, 14 become snagged.

A rearward tubular channel 52 includes a front opening 54 which is positioned adjacent to the rear opening 30 of the channel 26 at the underside 32 of the body 10, and a rear opening 56 located at the tip 58 of the tail portion 22. The interior 60 of the rearward channel 52 is also sized to allow the line 16 to slide relative to the channel in both a longitudinal and lateral direction, thereby eliminating the possibility of twists and kinks jamming the line within the channel.

The rigging of the system is best shown in FIG. 1. Fishing line 16 is inserted into the entry opening 34 of the forward channel 26 and fed through the channel until it exits the rear opening 30. At this location, it is passed through the eye of forward hook set 12 and then inserted into the front opening 54 of the rearward channel 52. The line 16 is fed through the rearward channel until it exits the rear opening 56, where it is tied to the eye of the rearward hook set 14.

A slight tug on the line 16 at a loation in front of the entry opening 34 causes the forward and rearward hook sets 12, 14 to be drawn close to the body 10 of the lure. This tension is maintained during casting and retrieval of the lure since the body 10 and bill 24 provide resistance in both air and water to keep the line taut and the hook set drawn close to the body. Consequently, strikes occurring either at the mid-portion or tail portion 22 will result in the forward or rearward hook sets, respectively, engaging a fish.

Experiments conducted with the type of lure shown in FIGS. 1 and 2 indicate that the positioning of the external segment 40 adds to the "action" of the lure as it is being retrieved.

Figure 3:
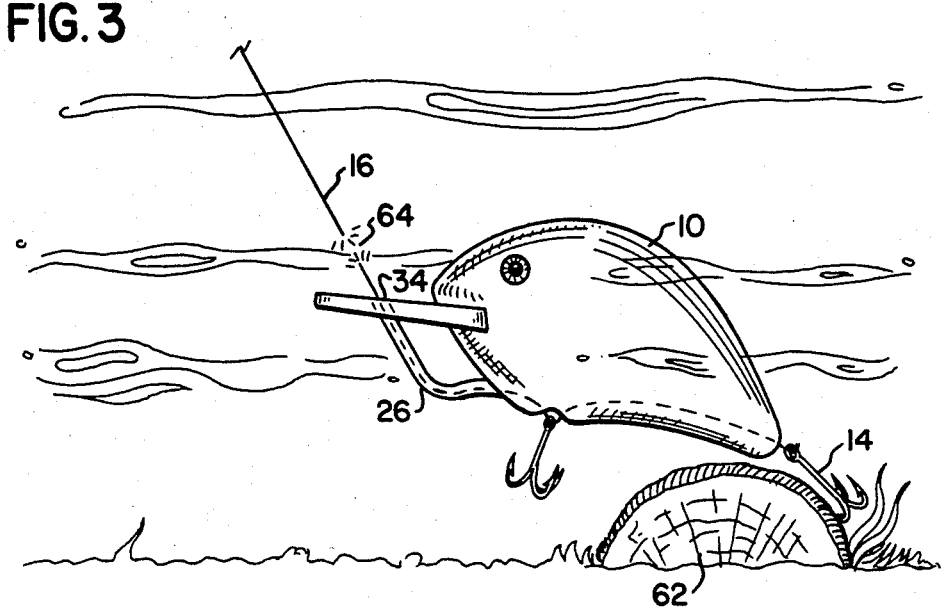
FIG. 3 is a side elevation of the rigging system of FIG. 1 in which the rear hook has been snagged and the line has been broken.
Figure 4:
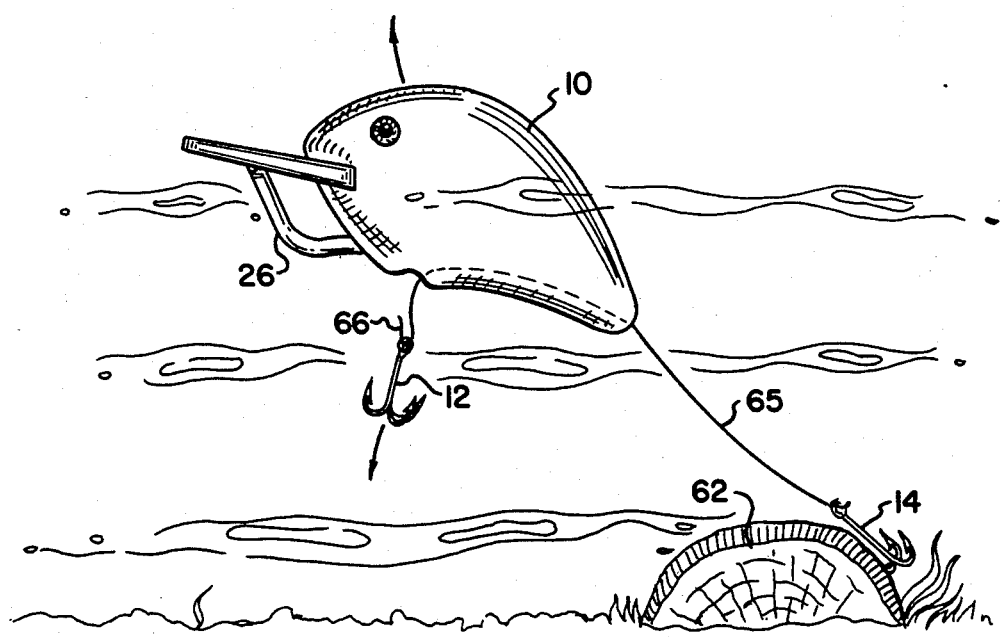
FIG. 4 shows the rigging system of FIG. 3 in which the lure body has begun to slide along the broken line segment.

FIGS. 3 and 4 show sequentially the retrieval of the lure body 10 upon the snagging of the rearward hook set 14 on a submerged log 62. In the event that one of the hook sets does become snagged as the lure is being reeled in, and a tugging on the line 16 does not free the lure, the line is broken at a location 64 which is in advance of the lure body 10. The natural buoyancy of the lure body 10 causes it to float upwardly away from the submerged log 62. Since the rearward hook set 14 is still lodged in the log 62, the line segment 65 attached to it pays out first through the forward channel 26, then through the rearward channel 52 (see FIG. 1). As the segment 65 passes through the eye of the forward hook set 12, the forward hook set is released from the lure, and the lure body continues to float upwardly toward the surface of the water.

Although not shown in the drawings, the same action would occur if the break 64 occurred at a point rearward of the entry opening 34 of the forward channel 26.

Figure 5:
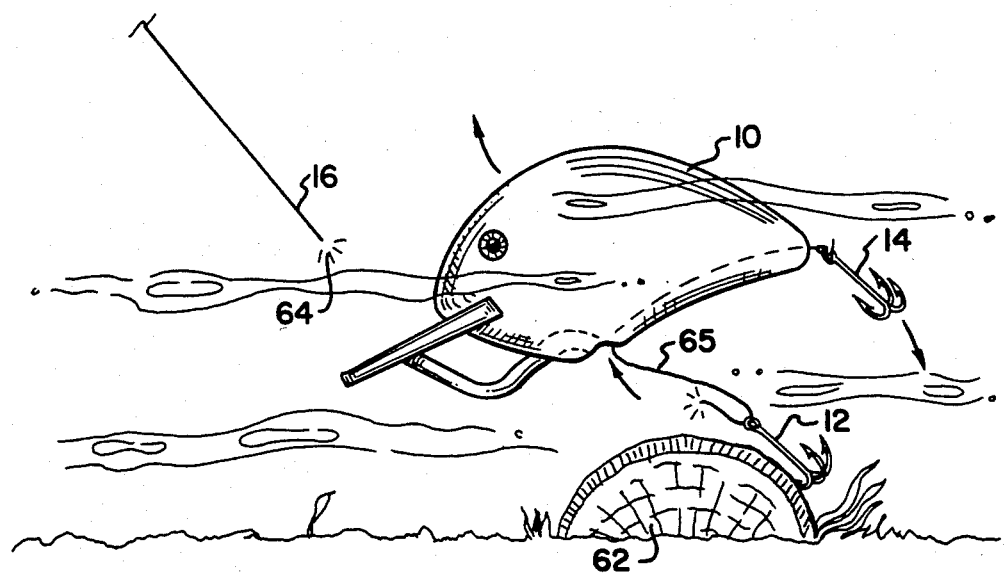
FIG. 5 is a side elevation of the rigging system of FIG. 1 in which the forward hook set has become snagged and the line has been broken.

FIG. 5 shows the action of the lure body in the event that the forward hook set 12 becomes snagged on a submerged log 62. Once the lure is snagged in this manner, the line 16 is broken at 64 and the natural buoyancy of the lure body 10 causes the body to float upwardly away from the submerged log 62 and hook set 12. This relative upward motion causes the broken line segment 65 to pay out through the forward and rearward channels 26, 52. Since the lure body 10 is still weighted down slightly by the rearward hook set 14, it would have a natural tendency to assume a vertical position once completely free of forward hook set 12, whereupon the rearward hook set 14 would, as a result of gravity and negative buoyancy, float downwardly, and with segment 65, disengage from the lure body 10.

Futhermore, should body hook sets become snagged under water while the lure body is being reeled in, once the line is broken, the lure body will float to the top of the water as the line segment pays out through the channels. This same action would occur for above water snags, but in that case, the force of gravity on the lure body would pull the body downwardly away from the hook sets, causing the line segment to pay out.

Figure 6:
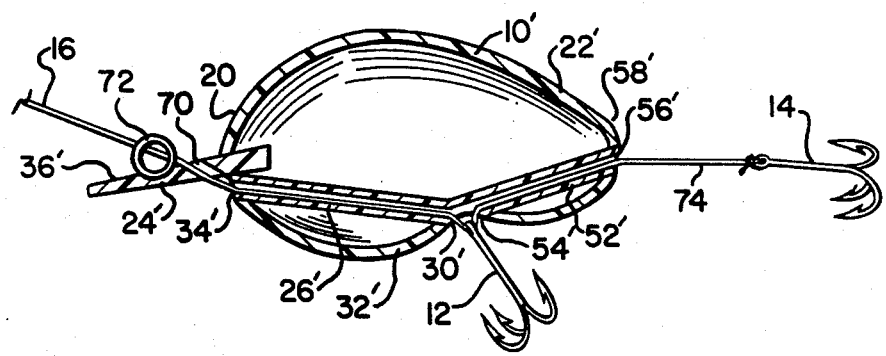
FIG. 6 is a side elevation of an alternate embodiment of the lure rigging system of the invention, in which the lure body and bill are partially broken away.

An alternate embodiment of the rigging system is shown in FIG. 6. In this embodiment, a lure body 10' has a hollow interior through which extends a forward channel 26' and a rearward channel 52'. The forward channel 26' includes an entry opening 34' located in the nose portion 20' below the bill 24'. The forward channel 26' includes a rear opening 30' located at the underside 32' of the body 10'. The rearward channel 52' includes a front opening 54' and a rear opening 56'. The front opening 54' is adjacent to the rear opening 30' of the forward channel, and the rear opening 56' is located at the tip 58' of the tail portion 22' of the body.

The bill 24' includes an opening 70 which is positioned adjacent to the front opening 34' of the forward channel 26'. A split ring 72, such as that shown in Francklyn U.S. Pat. No. 3,514,890, is located immediately in front of the opening 70 of the upper surface 36' of the bill. The split ring 72 is made of metal and is embedded in the plastic material of the bill 36'.

The line 16 is connected to the lure body by first inserting it through the opening 70 and into the forward channel 26' through the front opening 34', and out the rear opening 30'. There, it is threaded through the eye of the forward hook set 12 and into the rearward channel 52' through its front opening 54' and out the rear opening 56'. The end of the line is then secured to the eye of the rearward hook set 14.

By clamping the line in the split ring 72, a length of line 74 can be made to protrude from the rear opening 56' so that the rearward hook set 14 trails behind the lure body 10' as it is reeled in. This rigging system, shown in FIG. 6, results in a "stinger hook" trailing behind the tail portion 22' of the lure body 10'. The action of the lure body 10' upon the snagging of either the forward or rearward hook sets 12, 14 during retrieval is the same of that described with respect to the embodiment shown in FIGS. 1-5, except that an initial tug on the line 16 is required to free the line segment from the split ring 72. Accordingly, the split ring 72 must be placed sufficiently in front of the opening 70 so that a high tension on the line, but below the tension required to break the line, will cause the line to straighten out and disengage itself from the split ring. It is within the scope of the invention to provide such a split ring on the bill 24 of the embodiment shown in FIGS. 1-5, at a location forward of the opening 34.

It should be noted that the present invention has been described with reference to a particular shape of lure body; namely, one that is rather short in relation to its height and thickness. However, the design of the alternate embodiment shown in FIG. 6 is applicable to other lure body shapes such as elongate "pencil-type" bait which has a great length in relation to its height and width, surface bait, and crank or diving bait.

The choice of which embodiment works best with a particular body shape is best determined by experimentation. However, it has been found that the system of FIG. 6 works best on pencil-type bait, while the system of FIG. 1-5 works best on shorter, "fatter" lure bodies.

Furthermore, it is also within the scope of the invention to provide an embodiment in which intermediate hook sets are provided between the forward and rearward hook sets. All that is required is that appropriate openings be made in the underside of the lure body communicating with the rearward channel so that the line can be passed through the eyes of intermediate hook sets at those openings and then secured to the rearward hook set.

While the forms of apparatus herein described constitute preferred embodiments of this invention, it is to be understood that the invention is not limited to these precise of forms of apparatus, and that changes may be made therein without departing from the scope of the invention.

What is claimed is:

1. A fishing lure rigging system comprising:
   a buoyant lure body having a nose portion, a tail portion, a forward tubular channel extending from said nose portion downwardly and rearwardly to an underside of said body midway along a length thereof, said forward channel having a front opening at said nose portion and a rear opening at said underside midway along a length thereof, and a rearward tubular channel extending from said forward passage rear opening upwardly and rearwardly to said tail portion, said rearward channel having a front opening adjacent to said forward channel rear opening and a rear opening at said tail portion;
   forward hook means positioned at a junction of said forward channel rear opening and said rearward channel front opening;
   rear hook means positioned at said rearward channel rear opening;
   a length of fishing line attached at an end thereof to said rear hook means and extending therefrom through said rearward channel rear opening, said rearward channel, and said rearward channel front opening, then being slidably attached to said forward hook means, then through said forward channel rear opening, said forward channel, and out of said forward channel front opening; and
   said forward and rearward tubular channels being sized to slidably receive said length of fishing line, and said body being sufficiently buoyant whereby severance of said line forwardly of said body, in the event that either or both of said hook means become snagged, permits said body to float upwardly therefrom and disengage itself from said line.

2. The rigging system of claim 1 further comprising flat, plate-shaped bill means attached to and protruding forwardly from said nose portion, said bill means being positioned thereon adjacent to said front opening and including a hole superposed thereto.

3. The rigging system of claim 2 further comprising split ring means routed on said bill forwardly of said hole and adapted to releaseably clamp a line.

4. The lure rigging system of claim 1 wherein said nose portion includes flat, plate-shaped bill means extending forwardly from said body; and said forward channel includes a tubular external segment spaced from said body and extending downwardly from said bill means at a point forwardly of said nose portion, and rearwardly to enter said nose portion below said bill means.

5. A fishing lure rigging system comprising:
a buoyant lure body having a nose portion, a tail portion, a forward tubular channel extending from said nose portion downwardly and rearwardly to an underside of said body midway along a length thereof, said forward channel having a front opening at said nose portion and a rear opening at said underside midway along a length thereof, and a rearward tubular channel extending from said forward channel rear opening upwardly and rearwardly to said tail portion, said rearward channel having a front opening adjacent to said forward channel rear opening and a rear opening at said tail portion;
flat, plate-shaped bill means extending forwardly from said nose portion;
said forward channel including an external segment spaced from said body and extending downwardly from said bill means at a point forwardly of said nose portion, and rearwardly to enter said nose portion, said external segment intersecting said bill means at an angle of approximately 55°, and including an upwardly curved, arcuate portion, said arcuate portion extending below said underside of said body sufficiently to act as a bumper to reduce the likelihood of said forward and rear hook means snagging;
forward hook means positioned at a function of said forward channel rear opening and said rearward channel front opening;
rear hook means positioned at said rearward channel rear opening; and
a length of fishing line attached at an end thereof to said rear hook means and extending therefrom through said rearward channel rear opening, said rearward channel, said rearward channel front opening, then being slidably attached to said forward hook means, then through said forward channel rear opening, said forward channel, said forward channel front opening, said tubular external segment, and out said mouth thereof.

6. A fishing lure rigging system comprising:
a buoyant lure body having a nose portion and a tail portion;
bill means attached to said nose portion and extending forwardly therefrom;
a forward tubular channel including an external segment spaced from said body and extending downwardly from said bill means and rearwardly to said nose portion, and a segment internal to said nose portion and continuous with said external segment, extending downwardly to terminate at a rear opening at an underside of said body midway along a length thereof; and
a rearward tubular channel extending from said forward channel rear opening upwardly and rearwardly to said tail portion, said rearward passage having a front opening adjacent to said forward channel rear opening and a rear opening at said tail portion.

7. A fishing lure rigging system comprising:
a buoyant lure body having a nose portion, a tail portion, a forward tubular channel extending from said nose portion downwardly and rearwardly to an underside of said body midway along a length thereof, said forward channel having a front opening at said nose portion and a rear opening at said underside midway along a length thereof, and a rearward tubular channel extending from said forward passage rear opening upwardly and rearwardly to said tail portion, said rearward channel having a front opening adjacent to said forward channel rear opening and a rear opening at said tail portion;
flat, plate-shaped bill means extending forwardly from said body; and
said forward channel including a tubular external segment spaced from said body and extending downwardly from said bill means at a point forwardly of said nose portion, and rearwardly to enter said nose portion below said bill means.

8. The rigging system of claim 7 wherein said external segment intersects said bill means at an angle of approximately 55°.

9. The rigging system of claim 7 wherein said external segment includes an upwardly curved, arcuate portion, said arcuate portion extending below said underside of said body sufficiently to act as a bumper to reduce the likelihood of snagging hooks associated with said body.

10. The rigging system of claim 7 further comprising:
forward hook means positioned at a junction of said forward channel rear opening and said rearward channel front opening;
rear hook means positioned at said rearward channel rear opening; and
a length of fishing line attached at an end thereof to said rear hook means and extending therefrom through said rearward channel rear opening, said rearward channel, said rearward channel front opening, then being slidably attached to said forward hook means, then through said forward channel rear opening, said forward channel, and out said forward channel front opening.

* * * * *